(12) United States Patent
Iijima

(10) Patent No.: US 7,324,289 B2
(45) Date of Patent: Jan. 29, 2008

(54) ZOOM LENS SYSTEM

(75) Inventor: Kenji Iijima, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 0 days.

(21) Appl. No.: 11/717,998

(22) Filed: Mar. 14, 2007

(65) Prior Publication Data

US 2007/0217027 A1    Sep. 20, 2007

(30) Foreign Application Priority Data

Mar. 20, 2006   (JP)   ............................. 2006-077267
Sep. 25, 2006   (JP)   ............................. 2006-258918

(51) Int. Cl.
*G02B 15/14*   (2006.01)

(52) U.S. Cl. ...................... 359/689; 359/680; 359/681; 359/682

(58) Field of Classification Search ........ 359/680–682, 359/686, 689
See application file for complete search history.

(56) References Cited

U.S. PATENT DOCUMENTS 6,308,011 B1   10/2001   Wachi et al.

FOREIGN PATENT DOCUMENTS

JP   2002-072091   12/2002
JP   2002-072093   12/2002

*Primary Examiner*—Scott J. Sugarman
*Assistant Examiner*—James R Greece
(74) *Attorney, Agent, or Firm*—Thompson Hine LLP

(57) ABSTRACT

A zoom lens system comprises, in order from an object side, a negative first lens group G1, a positive second lens group G2 and a positive third lens group that has positive refractive power. In the zoom lens system, zooming is carried out by moving the first lens group and the second lens group, the first lens group consists of two or three lenses that include a negative glass lens located closest to the object side, the second lens group consists, in order from the object side, of a cemented lens composed of a positive glass lens and a negative glass lens and a plastic meniscus lens that is convex on the object side and both surfaces of which are aspherical, the third lens group consists of one positive plastic lens, and a combined focal length f2 of the second lens group and a focal length Lf23 of the plastic meniscus lens in the second lens group satisfy the following condition $0 < |f2/Lf23| < 0.3$.

7 Claims, 10 Drawing Sheets

Fig. 3

| No | r | d | nd | vd | |
|---|---|---|---|---|---|
| 1 | 25.1140 | 0.60 | 1.65160 | 58.5 | glass lens L11 |
| 2 | 3.7982 | 0.85 | | | |
| 3 | 8.0093 | 0.60 | 1.52512 | 56.3 | plastic lens L12 |
| 4 | 3.5518 | 0.95 | | | |
| 5 | 5.3112 | 1.30 | 1.58550 | 30.0 | plastic lens L13 |
| 6 | 23.7845 | d6 | | | |
| 7 | Flat | 0.20 | | | stop S |
| 8 | 3.1183 | 2.00 | 1.74320 | 49.3 | glass lens L21 |
| 9 | -5.0209 | 0.55 | 1.74077 | 27.8 | glass lens L22 |
| 10 | 4.4333 | 0.60 | | | |
| 11 | 2.7754 | 0.60 | 1.52512 | 56.3 | plastic lens L23 |
| 12 | 3.0838 | d12 | | | |
| 13 | 9.1752 | 1.00 | 1.52512 | 56.3 | plastic lens L31 |
| 14 | -20.6732 | 1.00 | | | |
| 15 | Flat | 0.20 | 1.54430 | 69.8 | OF1 |
| 16 | Flat | 0.30 | | | |
| 17 | Flat | 0.20 | 1.51680 | 64.2 | OF2 |
| 18 | Flat | | | | |

Fig. 7

| No | r | d | nd | vd | |
|---|---|---|---|---|---|
| 1 | 89.673 | 0.50 | 1.80610 | 40.7 | glass lens L11 |
| 2 | 2.609 | 1.00 | | | |
| 3 | 4.939 | 1.10 | 1.84666 | 23.8 | glass lens L12 |
| 4 | 16.441 | d4 | | | |
| 5 | Flat | 0.45 | | | stop S |
| 6 | 2.975 | 1.65 | 1.80420 | 46.5 | glass lens L21 |
| 7 | -3.277 | 0.50 | 1.74077 | 27.8 | glass lens L22 |
| 8 | 4.515 | 0.30 | | | |
| 9 | 2.794 | 0.50 | 1.52528 | 55.9 | plastic lens L23 |
| 10 | 2.564 | d10 | | | |
| 11 | 12.207 | 0.90 | 1.52528 | 55.9 | plastic lens L31 |
| 12 | -12.521 | 1.00 | | | |
| 13 | Flat | 0.50 | 1.51680 | 64.2 | OF1 |
| 14 | Flat | 0.00 | | | |
| 15 | Flat | 0.25 | 1.51680 | 64.2 | OF2 |
| 16 | Flat | | | | |

Fig. 11

| No | r | d | nd | vd | |
|---|---|---|---|---|---|
| 1 | 21.290 | 0.50 | 1.69680 | 55.5 | glass lens L11 |
| 2 | 3.042 | 0.95 | | | |
| 3 | 11.503 | 0.50 | 1.52528 | 55.9 | plastic lens L12 |
| 4 | 5.014 | 0.40 | | | |
| 5 | 4.999 | 1.30 | 1.58547 | 29.9 | plastic lens L13 |
| 6 | 39.024 | d6 | | | |
| 7 | Flat | 0.45 | | | stop S |
| 8 | 3.006 | 1.80 | 1.69680 | 55.5 | glass lens L21 |
| 9 | −3.116 | 0.50 | 1.67270 | 32.2 | glass lens L22 |
| 10 | 6.545 | 0.30 | | | |
| 11 | 2.691 | 0.50 | 1.52528 | 55.9 | plastic lens L23 |
| 12 | 2.340 | d12 | | | |
| 13 | 20.104 | 0.90 | 1.52528 | 55.9 | plastic lens L31 |
| 14 | −10.856 | 1.00 | | | |
| 15 | Flat | 0.50 | 1.51680 | 64.2 | OF1 |
| 16 | Flat | 0.00 | | | |
| 17 | Flat | 0.25 | 1.51680 | 64.2 | OF2 |
| 18 | Flat | | | | |

ZOOM LENS SYSTEM

CROSS-REFERENCE TO RELATED APPLICATIONS

This application is based upon and claims the benefit of priority from the prior Japanese Patent Applications No. 2006-77267, filed Mar. 20, 2006, and No. 2006-258918, filed Sep. 25, 2006, the entire contents of which are incorporated herein by reference.

BACKGROUND

The present invention relates to a zoom lens system suited to incorporation in a digital camera or an information terminal such as a mobile phone equipped with a digital camera function.

Digital cameras are known where an image pickup device such as a CCD or a CMOS produces digital data for an image formed by a lens or lenses. Information terminals such as mobile phones in which a digital camera is incorporated are also known.

There is demand for a lightweight, compact zoom lens system for use as a zoom lens installed in a compact digital camera or a mobile information terminal. One method of reducing the weight of a lens system is to use plastic lenses in the lens system.

Japanese Laid-Open Patent Publication No. 2002-72091 discloses a zoom lens system that includes plastic lenses and is composed of a total of eight or nine lenses in three lens groups whose refractive powers are respectively negative, positive, and positive or negative, positive, and negative in that order from the object (subject) side. In this publication, a zoom lens system with a total of three plastic lenses composed of one lens in each group is also disclosed as the example with the maximum number of plastic lenses.

Japanese Laid-Open Patent Publication No. 2002-72093 similarly discloses a zoom lens system that includes plastic lenses and is composed of a total of eight or nine lenses in three lens groups whose refractive powers are respectively negative, positive, and positive or negative, positive, and negative in that order from the object side. In this publication, a zoom lens system with a total of four plastic lenses composed of two lenses in the first lens group and one lens in each of the second and third groups is disclosed as the example with the maximum number of plastic lenses.

To further reduce the weight of a zoom lens system and make the system more compact, it is preferable to increase the proportion of the number of plastic lenses to the total number of lenses and to further reduce the total number of lenses that construct the lens system. However, since the thermal expansion coefficient of plastic lenses is highly dependent on temperature, it is difficult to utilize plastic lenses for lenses that have a high refractive power in a digital camera or an information terminal that will be used in various temperature conditions. Even in the publications described above, the proportion of number of plastic lenses is half or less of the total number of lenses.

Also, since the surface strength of plastic lenses is low compared to glass lenses, it is difficult to use a plastic lens for the closest lens to the object side that is exposed to the outside. In this way, it is difficult to increase the proportion of the number of plastic lenses used in a zoom lens system.

To realize a compact, lightweight zoom lens system, it is also important to make the driving mechanism for moving the lens groups during zooming (variation in magnification) more compact. In Japanese Laid-Open Patent Publication No. 2002-72093, a larger proportion of plastic lenses is used compared to Japanese Laid-Open Patent Publication No. 2002-72091. However, this zoom lens system is designed with a premise of all three lens groups being moved during zooming, which makes the driving mechanism complicated and means such system is unsuited to incorporation in a mobile apparatus.

U.S. Pat. No. 6,308,011 discloses a zoom lens constructed of a total of seven or eight lenses in three units whose refractive powers are negative, positive, and positive in that order from the object side. In this document, 4 types of the second lens unit are disclosed. Four types are, in order from the object side: (a1) a single positive lens; (a2) a single positive lens and a single negative lens; (a3) a positive lens, a negative lens, and a positive lens; and (a4) a positive lens, a positive lens, a negative lens, and a positive lens. Plastic lenses are fundamentally not used in this second lens unit. The document also states that it is preferable to include an aspherical surface in the construction (a4) to reduce the size of the second lens unit. The document also discloses that the arrangement (a3) is most preferable, with a combination of a bi-convex lens, a bi-concave lens, and a bi-convex lens in that order from the subject (i.e., a so-called triplet) being preferably used as the second lens unit.

SUMMARY OF THE INVENTION

A first aspect of the present invention is a zoom lens system including, in order from an object side thereof: a first lens group that has negative refractive power; a second lens group that has positive refractive power; and a third lens group that has positive refractive power, wherein zooming is carried out by moving the first lens group and the second lens group. In this zoom lens system, the respective lens groups have arrangements described below. The first lens group consists of two or three lenses that include a negative glass lens located closest to the object side. The second lens group consists, in order from the object side, of a cemented lens and a plastic meniscus lens. The cemented lens is composed of a positive glass lens and a negative glass lens. The plastic meniscus lens is convex on the object side and both surfaces of which are aspherical. The third lens group consists of one positive plastic lens. A combined focal length f2 of the second lens group and a focal length Lf23 of the plastic meniscus lens in the second lens group satisfy the following condition $$0 < |f2/Lf23| < 0.3 \qquad (1).$$

This zoom lens system consists of a total of six or seven lenses and aside from the negative lens closest to the object side in the first lens group and the positive and the negative lenses that construct the cemented lens (the balsam lens) of the second lens group, the remaining three or four lenses are composed of plastic lenses.

Condition (1) suppresses temperature-caused fluctuations in performance by reducing the refractive power of the plastic lens included in the second lens group relative to the power of the second lens group. Accordingly, the plastic meniscus lens of the second lens group is a positive plastic lens or a negative plastic lens that has hardly any refractive power or low refractive power. By using a meniscus lens with aspherical surfaces on both sides as the plastic lens, in a second lens group where the diameter of the entire group is reduced corresponding to concentrated rays (light flux), it is possible to increase the area of the aspherical surfaces that are effective for correcting aberration without increasing the lens diameter.

Condition (1) means that in the second lens group that is composed of a cemented lens and a low-power lens and has an overall positive refractive power, the power of the cemented lens is raised. Conventionally, cemented lenses tend to have low power, and an arrangement where a cemented lens is located at an advanced or leading position on an object side is not used since such arrangement would be disadvantageous when trying to reduce the distance between principal points. In this zoom lens system, by using an arrangement where the cemented lens that has relatively larger power in the second lens group is located at a leading position on the object side, the distance between principal points for the first lens group and the second lens group is reduced and it is possible to maintain a high zoom ratio of three while using a compact arrangement. In addition, by making the plastic lens located on the image forming side to the cemented lens in the second lens group a meniscus lens that is convex toward the object side, i.e., toward the cemented lens, it is possible to bring the principal focus of the second lens group closer to the first lens group.

One of aspects of the plastic meniscus lens of the second lens group is a lens with positive refractive power at the center and negative refractive power at the periphery. By doing so, it is possible for the plastic meniscus lens to contribute to the overall positive refractive power of the second lens group for rays on the center axis without raising the total or average power of the plastic lens.

One of other aspects of the plastic meniscus lens in the second lens group is a lens with negative refractive power that is the lens with negative refractive power for all rays or every ray. This contributes to reducing the distance between principal points of the first lens group and the second lens group.

One of aspects of the first lens group consists of two glass lenses, so that the zoom lens system can consists of a total of six lenses.

One of other aspects of the first lens group consists of three lenses that in order from the object side include a negative glass lens, a negative plastic lens, and a positive plastic lens. In this case, the zoom lens system consists of a total of seven lenses and aside from the negative lens closest to the subject and the two lenses that construct the cemented lens (the balsam lens), the remaining four lenses are of plastic lenses. This zoom lens system is arranged with a total of just seven lenses, the proportion of the number of plastic lenses is over half to the total number of lenses, and the third lens group is fixed during zooming. Accordingly, this zoom lens system has a low total number of lenses, making it compact, and since the proportion of the number plastic lenses is high, the total weight is low. In addition, since the third lens group does not need to move during zooming, it is possible to make the entire system including the driving mechanism compact and lightweight. Also, since the proportion of plastic lenses is high and the driving mechanism is simplified, it is also possible to reduce the manufacturing cost.

In one of the aspects where the first lens group consists, in order from the object side, of the negative glass lens, a negative plastic lens and a positive plastic lens, a focal length Lf12 of the negative plastic lens of the first lens group and a focal length Lf13 of the positive plastic lens of the first lens group should preferably satisfy the following condition $$1.0 < |Lf12/Lf13| < 2.0 \quad (2).$$

Condition (2) reduces the difference of absolute values between the focal length of the positive plastic lens and the focal length of the negative plastic lens included in the first lens group (i.e., reduces the difference in refractive powers (absolute values)) so as to reduce the fluctuation in lens performance, and in particular in the back focus length, due to temperature changes.

The difference in absolute focal lengths between the positive plastic lens and the negative plastic lens included in the first lens group should more preferably satisfy the following condition $$1.0 < |Lf12/Lf13| < 1.5 \quad (2').$$

The refractive index Ln21 of the positive glass lens that constructs the cemented lens in the second lens group should preferably satisfy Condition (3) below.

$$Ln21 > 1.68 \quad (3)$$

The refractive index Ln21 of the positive glass lens that constructs the cemented lens in the second lens group should more preferably satisfy Condition (3') below.

$$Ln21 > 1.70 \quad (3')$$

To satisfy Condition (1), it is necessary to raise the power of the positive lens that constructs the cemented lens in the second lens group. However, when the curvature is increased, this can often result in aberration, which makes it difficult to correct aberration with a plastic lens with low power. It is therefore preferable to increase the refractive index of the positive lens of the cemented lens to produce a suitable refractive to the refractive power of the negative lens paired with the positive lens for achieving the required refractive power as the cemented lens without greatly increasing the curvature.

A combination including a positive lens with a low refractive index and a negative lens with a high refractive index is selected for the cemented lens (balsam lens) for purposes such as reducing the Petzval sum when a change in focal length by movement of a lens group with a large negative power is used for zooming. For example, a combination of a positive lens with a refractive index of below 1.68 and a negative lens with a refractive index of 1.68 or higher is selected. In this zoom lens system of the present invention, by raising the refractive index of the positive lens that constructs the cemented lens to satisfy Condition (3), it is possible to improve the total lens performance.

In this way, the zoom lens system of the present invention is lightweight, compact, and has a low cost, but also has a high zoom ratio and favorable image forming performance. Accordingly, the system of the present invention is suited to a camera, such as a digital camera, that includes a zoom lens system and an image pickup device disposed on an image forming side of the zoom lens system, and also suited to an information terminal that includes a camera function and a display device capable of displaying images from the image pickup device. Accordingly, such camera and such information terminal (for example, a mobile phone) are also included in scope of this present invention in accordance with the claims.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

FIG. 3 shows data on the respective lenses in the zoom lens system of the first embodiment;

FIG. 7 shows data on the respective lenses in the zoom lens system of the second embodiment;

FIG. 11 shows data on the respective lenses in the zoom lens system of the third embodiment;

DETAILED DESCRIPTION

Figure 1:
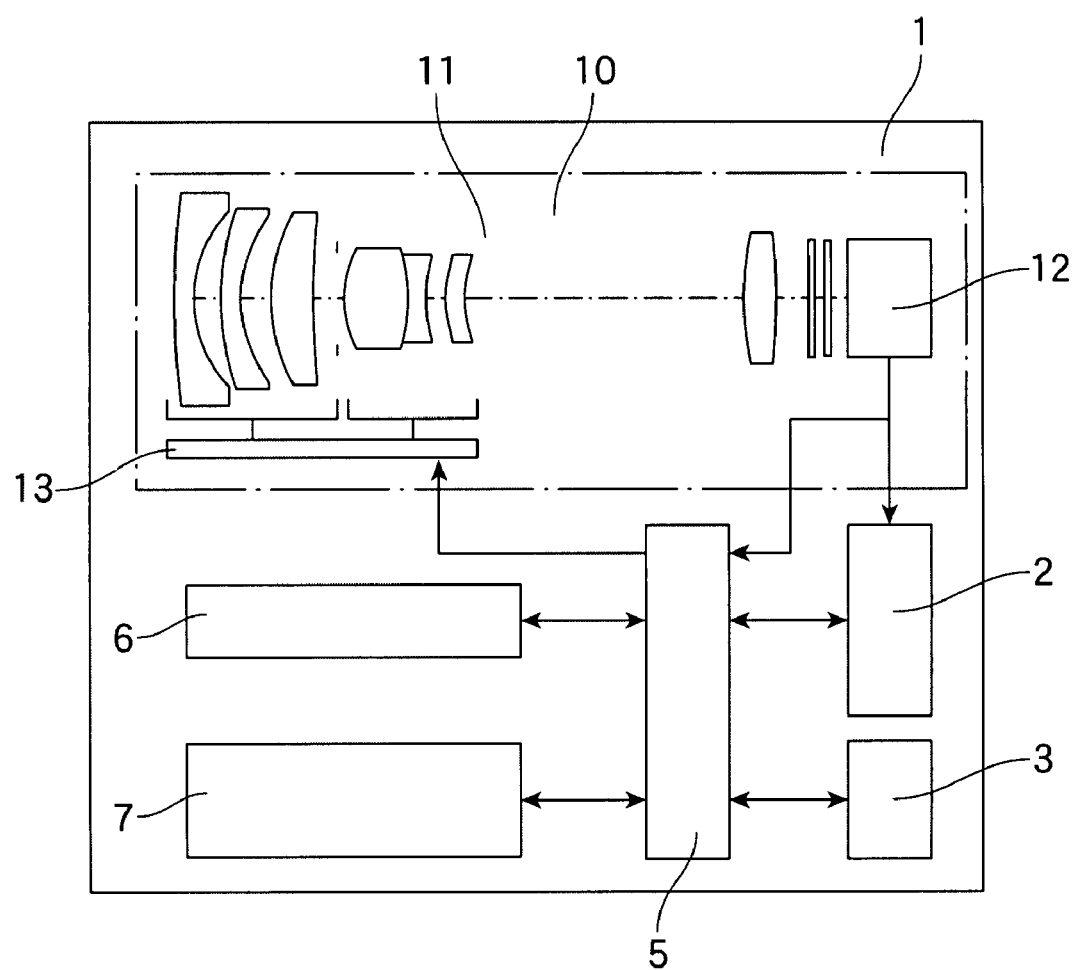
FIG. 1 is a diagram showing one example of an information terminal equipped with a camera function including a zoom lens system.

FIG. 1 shows the overall construction of an information terminal with a camera function. In more detail, this information terminal 1 is a mobile phone with a camera function or a PDA (Personal Data Acquisition, Personal Digital Assistant) with a camera function. The information terminal 1 is equipped with a digital camera function 10 which includes a zoom lens system 11, an image pickup device 12 disposed at an image formation position of the zoom lens system 11, and a lens driving mechanism 13 that carries out a zooming operation by moving lens groups in the zoom lens system 11. The information terminal 1 further includes a display device 2, a data input/output device 3, a control unit 5 including such as a CPU and/or other functional processor, a memory device 6 such as a RAM disk and/or a hard disk, and a communication unit 7 for wirelessly connecting to a public telephone network and/or a computer network. The image pickup device 12 is a CCD or CMOS sensor, for example, and converts an image formed by the zoom lens system 11 on an incident surface of the image pickup device 12 to digital data. The digital data can be displayed by the display device 2, stored in the memory device 6, and/or transmitted to another information terminal via the communication unit 7.

Figure 2A:
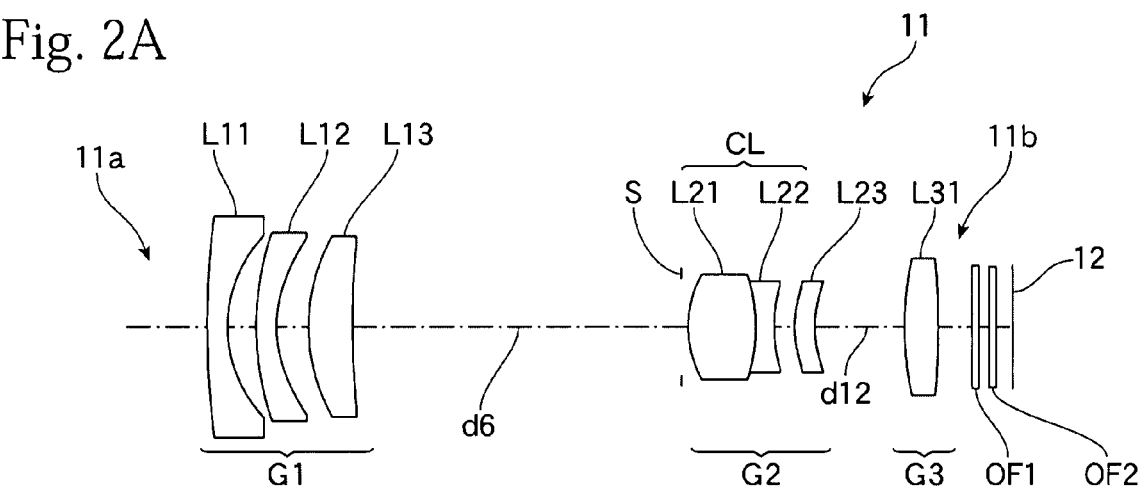
FIG. 2A shows the arrangement of lenses in a zoom lens system according to a first embodiment at a wide-angle end and FIG. 2B shows the arrangement of lenses at the telephoto end.
Figure 2B:
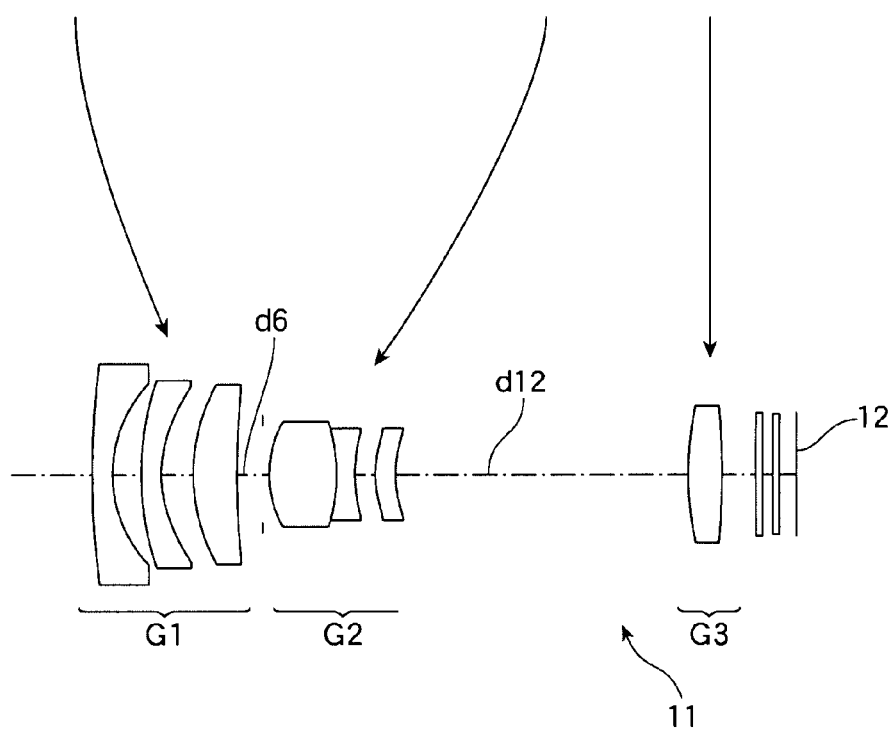

FIGS. 2A and 2B show arrangements of a first embodiment of the zoom lens system 11. FIG. 2A shows the arrangement of lenses at a wide-angle end where an enlarged image of an object (a subject) can be obtained, while FIG. 2B shows the arrangement of lenses at the telephoto end which is the standard state. The zoom lens system 11 is oriented so that an image-forming end (side) 11b of the zoom lens system 11 faces the image pickup device 12 and an object end (side) 11a that is the opposite end (side) of the zoom lens system 11 faces the outside. The zoom lens system 11 is composed of seven lenses numbered L11 to L13, L21 to L23, and L31 divided into three lens groups numbered G1 to G3 in that order from the object side 11a. These three lens groups G1 to G3 respectively have negative, positive, and positive refractive powers in that order from the object side 11a. The zoom lens system 11 as a whole is a retrofocus lens type and is telecentric or almost telecentric at the image-forming side 11b where the image pickup device 12 is provided, so that a sharp image can be produced on the image pickup device 12.

The first lens group G1 at the object side 11a has an overall negative refractive power and consists, in order from the object side 11a, of a negative meniscus lens L11 that is convex toward the object end 11a, another negative meniscus lens L12 that is convex toward the object side 11a, and a positive meniscus lens L13 that is convex toward the object side 11a. Out of these lenses L11, L12, and L13, only the closest lens to the object (the lens L11) is a glass lens, and the other lenses L12 and L13 are plastic lenses. In addition, both surfaces S3 and S4 of the plastic lens L12 are aspherical.

The second lens group G2 has an overall positive refractive power and consists of, in order from the object side 11a, of a cemented lens (a balsam lens) CL composed of a positive biconvex lens L21 and a negative biconcave lens L22, and a low-power meniscus lens L23 that is convex toward the object side 11a. Out of these lenses L21, L22, and L23, the lenses L21 and L22 are glass lenses and the lens L23 is a plastic lens. In addition, both surfaces S11 and S12 of the plastic lens L23 are aspherical. The plastic lens L23 has positive refractive power at the center (i.e., for paraxial rays) and negative refractive power at the periphery. Although the plastic lens L23 has hardly any refractive power, by making the lens L23 a meniscus lens that is convex toward the object side 11a, it is possible to increase the area of the aspherical surface that can be provided on the lens L23, thereby making it possible to improve the aberration-correcting performance of the lens L23. Also, even if the refractive power of the lens L23 is low, this will still affect the principal focal point of the second lens group G2, and therefore by using a meniscus lens that is convex toward the object side 11a as the lens L23, it is possible to bring the principal focal point of the second lens group G2 closer to the cemented lens CL and to the first lens group G1.

The third lens group G3 is a lens group with positive refractive power and, in this system, has a single lens arrangement composed of a biconvex plastic lens L31. In addition, two optical filters OF1 and OF2 that are made of plastic are provided between the third lens group G3 and the image pickup device 12. A "stop" (aperture) S is also disposed on the object side of the second lens group G2.

As shown in FIGS. 2A and 2B, when zooming from the wide-angle end to the telephoto end, the third lens group G3 of the zoom lens system 11 is fixed and the first lens group G1 and the second lens group G2 move so as to approach one another. Accordingly, only the first lens group G1 and the second lens group G2 are driven by the lens driving mechanism 13.

FIG. 3 shows the lens data. In the lens data "r" represents the radius of curvature (mm) of each lens disposed in order from the object side, "d" represents the distance (mm) between the respective lens surfaces disposed in order from the object side, "nd" represents the refractive index (d line) of each lens in order from the object side, and "vd" represents the Abbe number (d line) of each lens in order from the object side. The expression "Flat" indicates a flat surface. This is also the case for the embodiments described later.

During zooming, the stop S moves together with the second lens group G2, and therefore the distance d6 between the first lens group G1 and the stop S and the distance d12 between the second lens group G2 and the third lens group G3 vary.

Both surfaces S3 and S4 of the plastic lens L12, and S11 and S12 of the plastic lenses L23 are aspherical, and the aspherical coefficients thereof are as follows.

Surface S3
K=0.0000
A=−8.05342×10$^{-4}$, B=−4.24516×10$^{-5}$
C=2.57389×10$^{-5}$, D=−1.25434×10$^{-6}$ The aspherical surfaces are expressed by the following expression using the coefficients K, A, B, C, and D given above with X as the coordinate in the optical axis direction, Y as the coordinate in a direction perpendicular to the optical axis, and the direction in which light propagates as positive. This is also the case for the embodiments described later.

$$X=Y^2/R/[1+[1-(1+K)Y^2/R^2]^{1/2}]+AY^4+BY^6+CY^8+DY^{10}$$

Surface S4
K=0.0000
A=−3.74884×10$^{-3}$, B=−3.03512×10$^{-4}$
C=5.23283×10$^{-5}$, D=−4.63596×10$^{-6}$ Surface S11
K=0.0000
A=−1.78870×10$^{-2}$, B=−6.91924×10$^{-3}$
C=−2.06784×10$^{-3}$, D=1.97069×10$^{-4}$ Surface S12
K=0.0000
A=−1.47223×10$^{-3}$, B=−6.77590×10$^{-3}$
C=−2.56132×10$^{-3}$, D=8.59489×10$^{-4}$ Various values for the zoom lens system 11 during zooming are as follows. The unit of distance and/or length is mm that is also the case for the embodiments described later.

|  | Wide-angle end | Center | Telephoto end |
|---|---|---|---|
| Combined focal length f of system | 3.0 | 5.20 | 9.00 |
| F Number | 2.80 | 3.56 | 4.89 |
| d6 | 9.7892 | 4.0653 | 0.7626 |
| d12 | 2.6511 | 4.8590 | 8.6777 |

Focal length Lfl2 of lens L12: −12.74
Focal length Lfl3 of lens L13: 11.38
Focal length Lf23 of lens L23: 31.65
Combined focal length f2 of second lens group G2: 6.38
Back focus length: 0.5
Condition (1) (|f2/Lf23|): 0.20
Condition (2) (|Lfl2/Lfl3|): 1.12

Accordingly, the zoom lens system 11 according to the present embodiment satisfies Conditions (1) and (2), and also satisfies Condition (2'). The refractive index Ln21 of the negative lens L21 that constructs the cemented lens in the second lens group G2 is 1.74320 as shown in the lens data. Accordingly, the zoom lens system 11 further satisfies Condition (3) and also Condition (3'). The zoom lens system 11 consists of a total of seven lenses and is therefore compact. In addition, out of such seven lenses, aside from the lens L11 that is closest to the object side and the lenses L21 and L22 that construct the cemented lens CL, the other four lenses are plastic lenses, meaning that plastic lenses make up over half of the lenses in the system. The lens system also has a high zoom ratio of 3 and favorably corrects aberration such as chromatic aberration of magnification, and can form a sharp image on the image pickup device 12.

Figure 4:
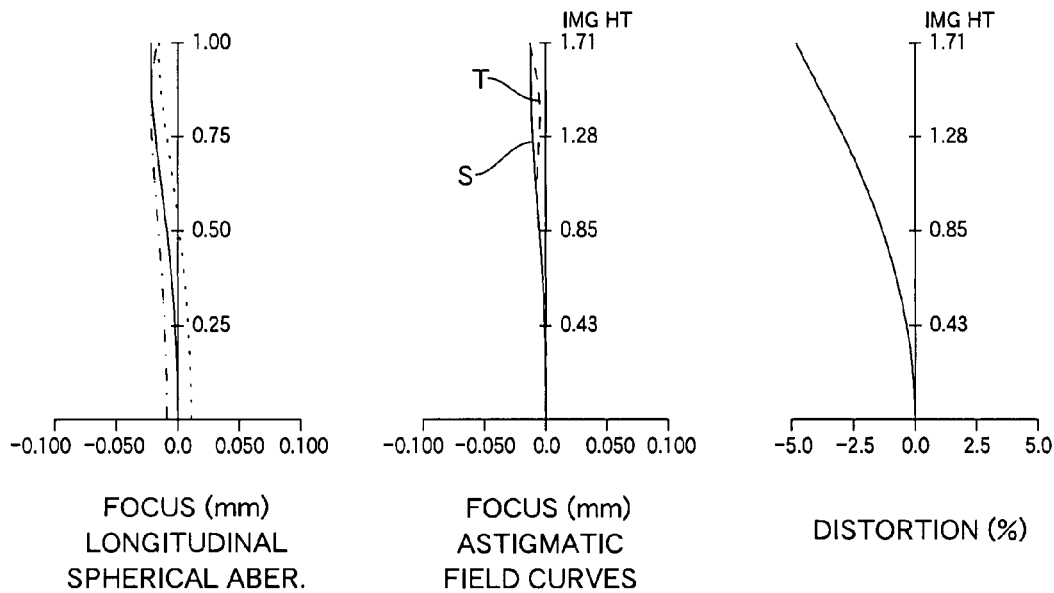
FIG. 4 shows various aberrations of the zoom lens system of the first embodiment at the wide-angle end.
Figure 5:
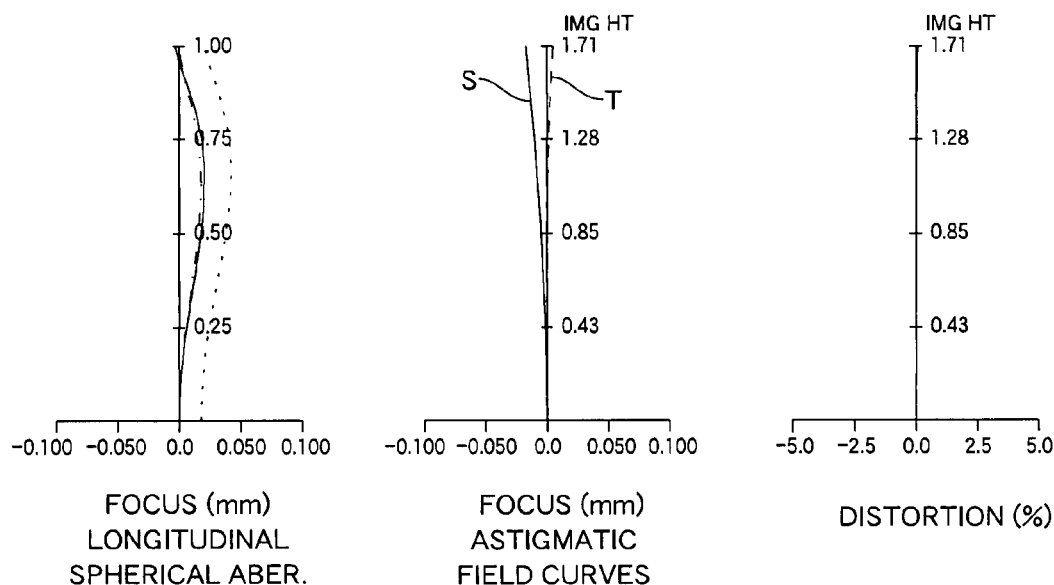
FIG. 5 shows various aberrations of the zoom lens system of the first embodiment at the telephoto end.

FIG. 4 shows the spherical aberration, astigmatism, and distortion of the zoom lens system 11 of the present embodiment at the wide-angle end. FIG. 5 shows the spherical aberration, astigmatism, and distortion of the zoom lens system 11 of the present embodiment at the telephoto end. Values of the spherical aberration for the respective wavelengths of 656 nm (broken line), 587 nm (solid line), and 486 nm (dot-dash line) are shown. In the graphs showing the astigmatism, the aberrations for tangential rays (T) and sagittal rays (S) are shown. This is also the case for the aberration graphs described later. Although the zoom lens system 11 according to the present invention is composed of seven lenses, over half of which (i.e., four lenses) are made of plastic, it is possible to make sharp images on the device 12 with an aberration correcting performance that is superior to that of a conventional zoom lens constructed of eight or nine lenses in three groups.

The zoom lens system 11 of the present embodiment consists of a total of seven lenses, over half of which are composed of plastic lenses, so that it is easy to make the lens system lighter and more compact. This makes the lens system well suited to the camera function incorporated in an information terminal such as a mobile phone. In addition, since the third lens group G3 is fixed and does not move during zooming, the lens driving mechanism 13 is simplified, which also results in the device becoming lighter and more compact and lowers the manufacturing cost.

In addition, by satisfying Conditions (1) and (2), it is possible to suppress the temperature dependency of the lens performance due to the use of a large number of plastic lenses. The zoom lens system 11 according to the present embodiment also satisfies Condition (2'), which is more preferable in terms of suppressing the temperature dependency of the optical performance of the lens system. This means that by using a camera function 10 equipped with the zoom lens system 11, it is possible to stably produce sharp images for an information terminal used in a variety of environments.

Note that in the zoom lens system 11 of this embodiment, the second lens group G2 includes the plastic meniscus lens L23 that has a low refractive power as a whole and is positive for paraxial rays. On the other hand, it is also possible to use a plastic lens that has a low refractive power as a whole and is negative, that is negative for all rays as the plastic meniscus lens L23. Making the overall refractive power of the second lens group G2 positive and the power of the lens L23 positive for paraxial rays is advantageous for producing a design where the second lens group G2 has sufficient refractive power. On the other hand, suppressing the power of the lens L23 within the range of Condition (1) and making the refractive power of the lens L23 negative for all rays are advantageous in making the zoom lens system 11 compact.

Instead of suppressing the power of the lens L23, it is possible to raise the refractive power of the positive lens L21 that constructs the cemented lens CL to achieve sufficient positive refractive power for the second lens group G2. To prevent a fall in performance due to the increased refractive power of the positive lens L21, it is possible to use a positive lens L21 with a high refractive power that satisfies Condition (3). In addition, a lens with a high refractive power that satisfies Condition (3') is used as the positive lens L21 of the present embodiment. Since a cemented lens CL with a relatively high power is used, in an arrangement of the second lens group G2, the cemented lens CL is located close to the subject. This arrangement can reduce the distance between principal points of the first lens group and the second lens group, and achieve a high zoom ratio of 3 in spite of the lens system having an overall compact size.

Figure 6A:
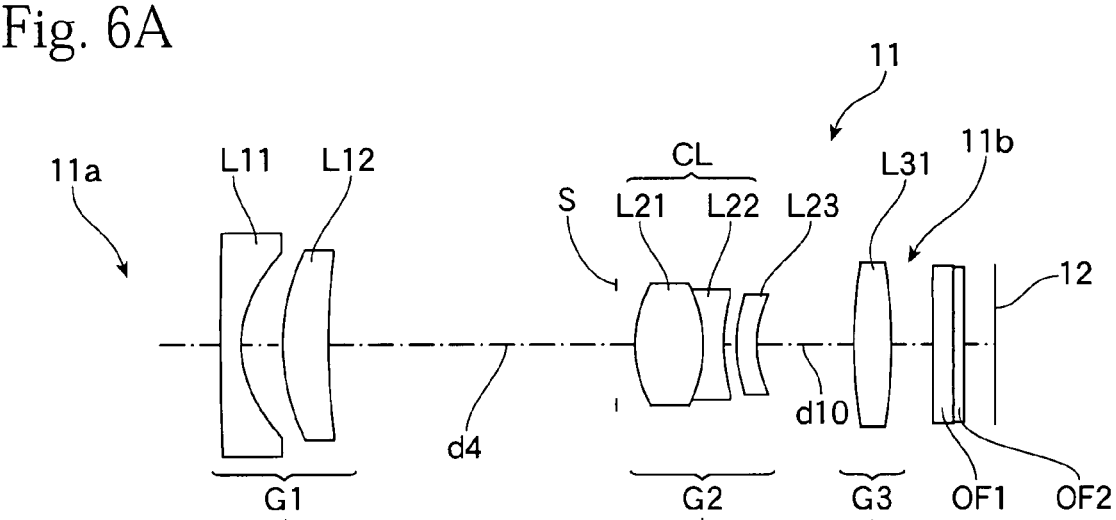
FIG. 6A shows the arrangement of lenses in a zoom lens system according to a second embodiment at a wide-angle end and FIG. 6B shows the arrangement of lenses at the telephoto end.
Figure 6B:
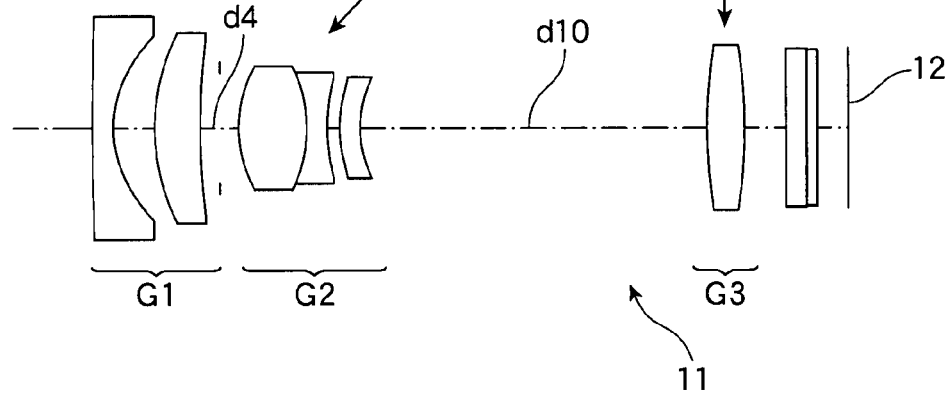

FIGS. 6A and 6B show an arrangement of a second embodiment of a zoom lens system 11. FIG. 6A shows the arrangement of lenses at the wide-angle end where an enlarged image of the subject is obtained, while FIG. 6B shows the arrangement of lenses at the telephoto end which is the normal or standard state. The zoom lens system 11 of the present embodiment consists of six lenses numbered L11, L12, L21 to L23, and L31 divided into three lens groups numbered G1 to G3 in that order from the object side 11a that respective groups have negative, positive, and positive refractive powers. Aside from the first lens group G1 being composed of two lenses, the fundamental arrangement is the same as that of the zoom lens system of the first embodiment described above.

FIG. 7 shows the lens data of the respective lenses in the zoom lens system 11 of the present embodiment. The first lens group G1 in the present embodiment has, in order from the object side 11a, a negative meniscus lens L11 that is convex toward the object side 11a and a positive meniscus lens L12 that is convex toward the object side 11a. Both lenses L11 and L12 are glass lenses with a high refractive index of 1.8 or higher. The surface S2 on the image-forming side 11b of the glass lens L11 is aspherical. By using glass lenses and an aspherical surface, it is possible to obtain sufficient power and aberration-correcting performance for the first lens group G1 using a simple construction composed of only two lenses.

The second lens group G2 has the low-power meniscus lens L23 that is convex on the object side and is located the image-forming side 11b. Both surfaces S9 and S10 of the lens L23 are aspherical. The lens L23 has negative refractive power even for center (and paraxial) rays. During zooming the distance d4 between the first lens group G1 and the stop S and the distance d10 between the second lens group G2 and the third lens group G3 vary.

The surface S2 on the image-forming side of the lens S11 and both surfaces S9 and S10 of the lens L23 are aspherical, and the aspherical coefficients thereof are as follows.

Surface S2
K=0.0000
A=−4.7771×10$^{-3}$, B=−7.0508×10$^{-4}$
C=9.3428×10$^{-5}$, D=−3.1082×10$^{-5}$ Surface S9
K=0.0000
A=−2.1238×10$^{-2}$, B=6.5386×10$^{-4}$
C=−1.0980×10$^{-2}$, D=2.8978×10$^{-3}$ Surface S10
K=0.0000
A=2.0678×10$^{-3}$, B=2.4712×10$^{-3}$
C=−1.2299×10$^{-2}$, D=4.1469×10$^{-3}$ Various values for this zoom lens system 11 during zooming are as follows.

|  | Wide-angle end | Center | Telephoto end |
|---|---|---|---|
| Combined focal length f of system | 3.0 | 5.20 | 9.00 |
| F Number | 2.74 | 3.54 | 4.95 |
| d4 | 6.9915 | 2.8658 | 0.4837 |
| d10 | 2.3387 | 4.5560 | 8.3965 |

-continued

|  | Wide-angle end | Center | Telephoto end |
|---|---|---|---|

Focal length Lf23 of lens L23: −232.99
Combined focal length f2 of second lens group G2: 5.44
Back focus length: 0.75
Condition (1) (|f2/Lf23|): 0.02

In the zoom lens system 11 of the present embodiment, the meniscus lens L23 has extremely low refractive power and is negative for all rays, and satisfies Condition (1). In addition, the refractive index Ln21 of the positive lens L21 that constructs the cemented lens CL of the second lens group G2 is 1.80420 as shown in the lens data. Accordingly, the zoom lens system 11 also satisfies Condition (3) and Condition (3').

Figure 8:
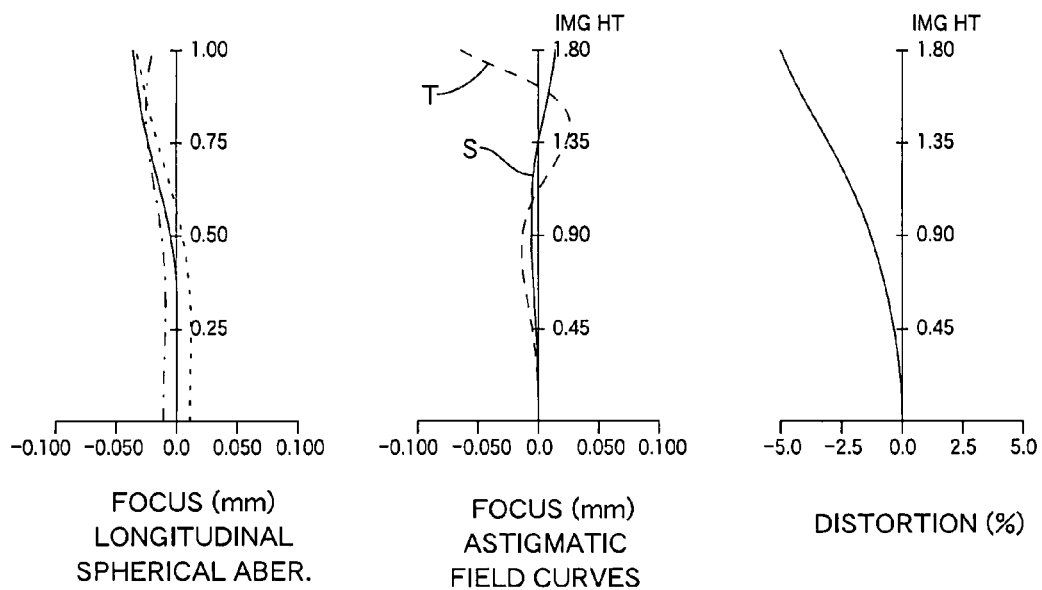
FIG. 8 shows various aberrations of the zoom lens system of the second embodiment at the wide-angle end.
Figure 9:
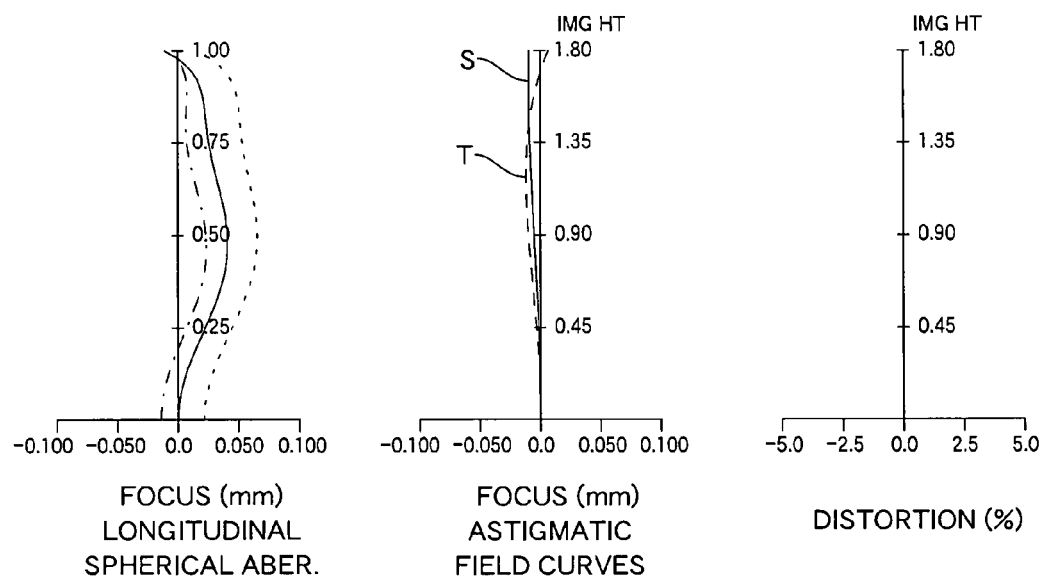
FIG. 9 shows various aberrations of the zoom lens system of the second embodiment at the telephoto end.

FIG. 8 shows the spherical aberration, astigmatism, and distortion of the zoom lens system 11 of the present embodiment at the wide-angle end. FIG. 9 shows the spherical aberration, astigmatism, and distortion of the zoom lens system 11 of the present embodiment at the telephoto end. The zoom lens system 11 consists of a total of six lenses and is therefore compact. The lens system also has a high zoom ratio of 3 and as shown in FIGS. 8 and 9 favorably corrects aberration such as chromatic aberration of magnification, and therefore can form a sharp image on the image pickup device 12.

Figure 10A:
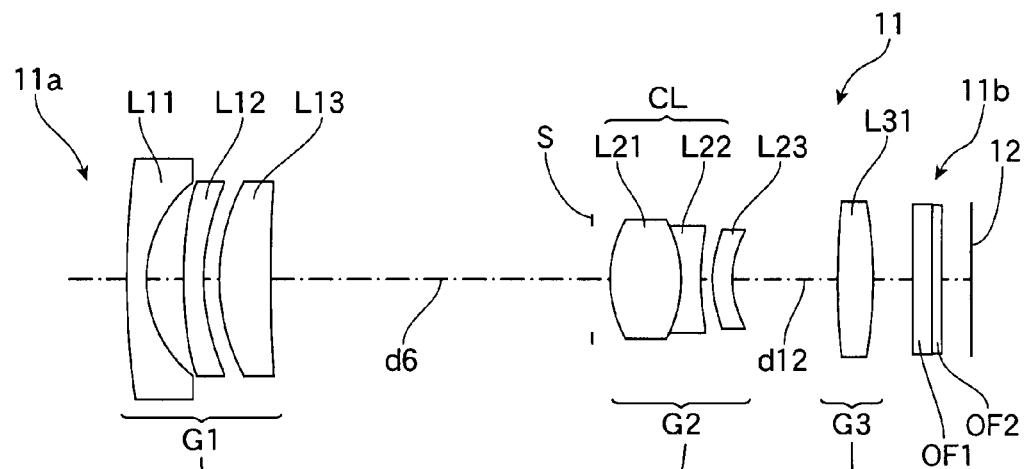
FIG. 10A shows the arrangement of lenses in a zoom lens system according to a third embodiment at a wide-angle end and FIG. 10B shows the arrangement of lenses at the telephoto end.
Figure 10B:
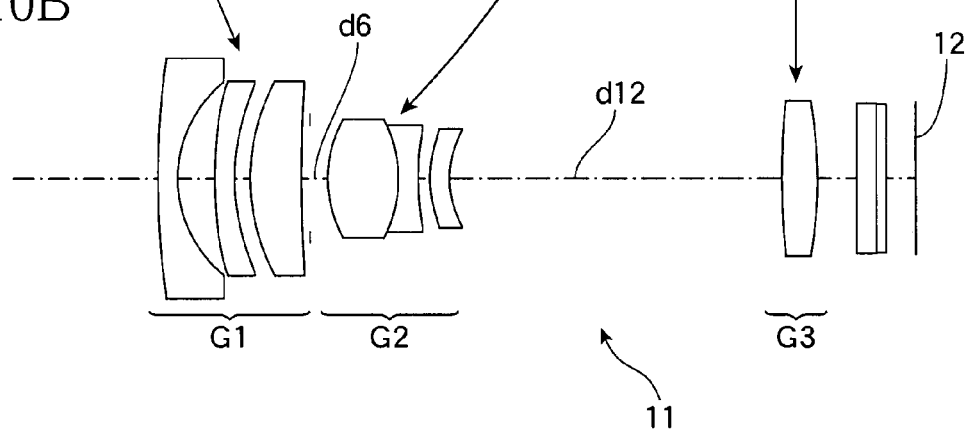

FIGS. 10A and 10B show the construction of a third embodiment of a zoom lens system 11. FIG. 10A shows the arrangement of lenses at a wide-angle end, while FIG. 10B shows the arrangement of lenses at the telephoto end. The zoom lens system 11 of the present embodiment is composed of seven lenses numbered L11 to L13, L21 to L23, and L31 divided into three lens groups numbered G1 to G3 in that order from the object side 11a that respective groups have negative, positive, and positive refractive powers. The fundamental arrangement is the same as that of the zoom lens system of the first embodiment described above.

FIG. 11 shows the lens data of the respective lenses in the zoom lens system 11 according to the present embodiment. The second lens group includes a low-power meniscus lens L23 that is convex toward the object side 11a and is disposed at the image-forming end 11b of the second lens group G2. Both surfaces S11 and S12 of the meniscus lens L23 are aspherical. The lens L23 has negative refractive power as a whole, even for center (paraxial) rays. During zooming the distance d6 between the first lens group G1 and the stop S and the distance d12 between the second lens group G2 and the third lens group G3 vary.

Both surfaces S3 and S4 of the lens L12 and both surfaces S11 and S12 of the lens L23 are aspherical, and the aspherical coefficients thereof are as follows.

Surface S3
K=0.0000
A=−1.4394×10$^{-3}$, B=1.1938×10$^{-3}$
C=−1.7814×10$^{-4}$, D=1.3376×10$^{-5}$ Surface S4
K=−6.3451
A=1.8865×10$^{-3}$, B=6.9078×10$^{-4}$
C=−1.5892×10-4, D=8.4375×10$^{-6}$ Surface S11
K=0.0000
A=−1.4896×10$^{-2}$, B=−3.2366×10$^{-3}$
C=−4.6592×10$^{-3}$, D=1.0812×10$^{-3}$ Surface S12
K=0.0000
A=3.1036×10$^{-3}$, B=-2.6580×10$^{-3}$
C=-6.0433×10$^{-3}$, D=1.9388×10$^{-3}$ Various values for the zoom lens system 11 during zooming are as follows.

|  | Wide-angle end | Center | Telephoto end |
|---|---|---|---|
| Combined focal length f of system | 3.0 | 5.20 | 9.00 |
| F Number | 2.84 | 3.61 | 4.95 |
| d6 | 8.1915 | 3.1396 | 0.2229 |
| d12 | 2.6586 | 4.7710 | 8.4304 |

Focal length Lf12 of lens L12: −17.38
Focal length Lf13 of lens L13: 9.66
Focal length Lf23 of lens L23: −67.04
Combined focal length f2 of second lens group G2: 5.87
Back focus length: 0.75
Condition (1) (|f2/Lf23|): 0.09
Condition (2) (|Lf12/Lf13|): 1.80

Accordingly, the zoom lens system 11 of the present embodiment satisfies Condition (1) and Condition (2). In the zoom lens system 11 according to the present embodiment, the lens L23 is a low-power meniscus lens that is negative for all rays. The lens systems according to the third embodiment and the second embodiment described above satisfy the condition (1') below and can favorably correct aberration by using a negative meniscus lens with extremely low refractive power in the second lens group G2.

$$0<|f2/Lf23|<0.1 \quad (1')$$

The zoom lens system 11 of the third embodiment consists of a total of seven lenses and is therefore compact. In addition, out of such seven lenses, aside from the lens L11 positioned closest to the object side and the lenses L21 and L22 that construct the cemented lens CL, the other four lenses are plastic lenses, meaning that plastic lenses make up over half of the lenses in the system. The refractive index Ln21 of the negative lens L21 that constructs the cemented lens in the second lens group G2 is 1.69680 as shown in the lens data, and therefore Condition (3) is satisfied. This means it is possible to make the overall lens system compact and to achieve a high zoom ratio of 3.

Figure 12:
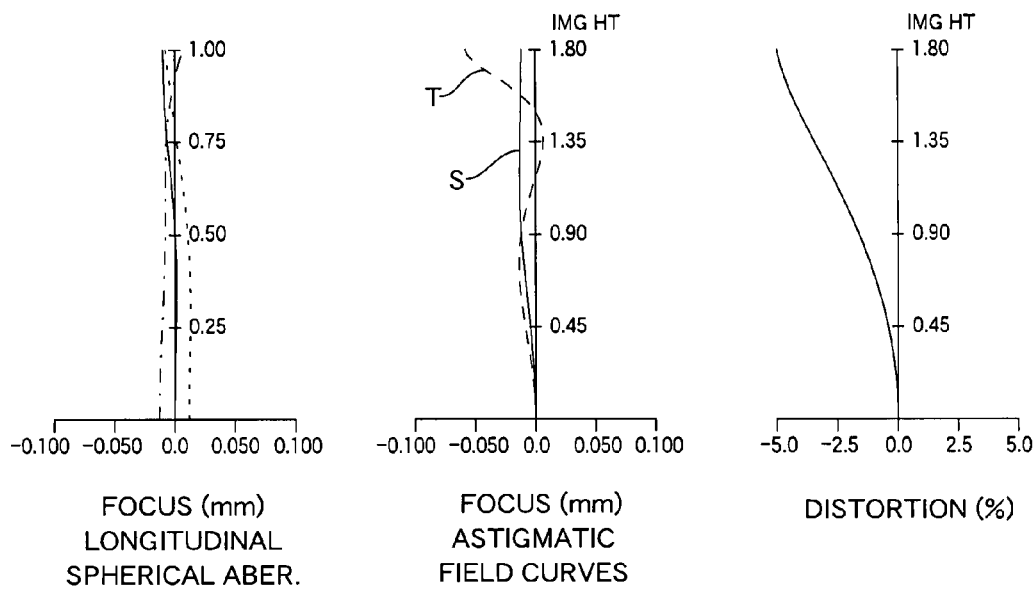
FIG. 12 shows various aberrations of the zoom lens system of the third embodiment at the wide-angle end.
Figure 13:
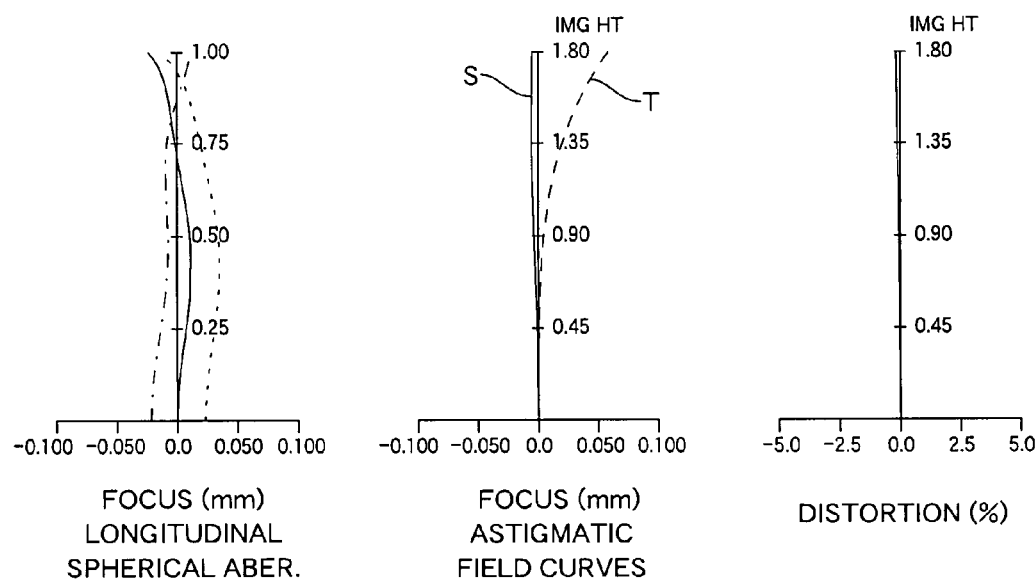
FIG. 13 shows various aberrations of the zoom lens system of the third embodiment at the telephoto end.

FIG. 12 shows the spherical aberration, astigmatism, and distortion of the zoom lens system 11 of the present embodiment at the wide-angle end. FIG. 13 shows the spherical aberration, astigmatism, and distortion of the zoom lens system 11 of the present embodiment at the telephoto end. The lens system has a high zoom ratio of 3 and favorably corrects aberration such as chromatic aberration of magnification, and therefore can form a sharp image on the image pickup device 12.

Note that although the information terminal 1 equipped with the camera function 10 has been described as one of the embodiments, it is also possible to apply the zoom lens system of the present invention to a digital camera, a web camera, or the like that provides a camera function mainly. It is possible to provide a camera that is compact and has a high zoom ratio.

What is claimed is:

1. A zoom lens system comprising, in order from an object side thereof:
    a first lens group that has negative refractive power;
    a second lens group that has positive refractive power; and
    a third lens group that has positive refractive power,
    wherein zooming is carried out by moving the first lens group and the second lens group,
    the first lens group consists of two or three lenses that include a negative glass lens located closest to the object side,
    the second lens group consists, in order from the object side, of a cemented lens composed of a positive glass lens and a negative glass lens and a plastic meniscus lens that is convex on the object side, both surfaces of the plastic meniscus lens being aspherical,
    the third lens group consists of one positive plastic lens, and
    a combined focal length f2 of the second lens group and a focal length Lf23 of the plastic meniscus lens in the second lens group satisfy the following condition $0<|f2/Lf23|<0.3$.

2. The zoom lens system according to the claim 1,
    wherein the first lens group consists, in order from the object side, of the negative glass lens, a negative plastic lens, and a positive plastic lens, and a focal length Lf12 of the negative plastic lens of the first lens group and a focal length Lf13 of the positive plastic lens of the first lens group satisfy the following condition $1.0<|Lf12/Lf13|<2.0$.

3. The zoom lens system according to the claim 1,
    wherein a refractive index Ln21 of the positive glass lens in the second lens group satisfies the following condition $Ln21>1.68$.

4. The zoom lens system according to the claim 1,
    wherein the plastic meniscus lens in the second lens group is a lens with positive refractive power at the center and negative refractive power at the periphery.

5. The zoom lens system according to the claim 1,
    wherein the plastic meniscus lens in the second lens group is a lens with negative refractive power.

6. A camera comprising:
    the zoom lens system according to the claim 1; and
    an image pickup device disposed on an image forming side of the zoom lens system.

7. An information terminal comprising:
    the camera according to claim 6; and
    a display device capable of displaying images from the image pickup device.

* * * * *